(12) United States Patent
Myers et al.

(10) Patent No.: US 7,863,570 B2
(45) Date of Patent: Jan. 4, 2011

(54) MULTIBAND, SINGLE ELEMENT WIDE FIELD OF VIEW INFRARED IMAGING SYSTEM

(75) Inventors: Mark Myers, Orlando, FL (US); Jeff Cole, Orlando, FL (US); Peter Falter, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/730,564

(22) Filed: Apr. 2, 2007

(65) Prior Publication Data
US 2007/0241281 A1    Oct. 18, 2007

Related U.S. Application Data

(63) Continuation of application No. 09/988,660, filed on Nov. 20, 2001, now abandoned.

(51) Int. Cl.
G01J 5/02    (2006.01)
(52) U.S. Cl. .................................................. 250/352
(58) Field of Classification Search .............. 250/352
See application file for complete search history.

(56) References Cited

U.S. PATENT DOCUMENTS

| | | | |
|---|---|---|---|
| 4,507,551 A * | 3/1985 | Howard et al. .............. 250/216 |
| 4,783,593 A | 11/1988 | Noble | |
| 4,827,130 A | 5/1989 | Reno | |
| 4,871,219 A * | 10/1989 | Cooper ........................ 359/356 |
| 5,258,618 A | 11/1993 | Noble | |
| 5,369,511 A * | 11/1994 | Amos ........................... 359/15 |
| 5,694,230 A | 12/1997 | Welch | |
| 5,903,005 A | 5/1999 | Smith | |
| 5,933,272 A | 8/1999 | Hall | |
| 5,965,899 A | 10/1999 | Little, Jr. | |
| 6,034,407 A * | 3/2000 | Tennant et al. .............. 257/440 |
| 6,103,544 A | 8/2000 | Dreiske et al. | |
| 6,180,990 B1 | 1/2001 | Claiborne et al. | |
| 6,208,459 B1 | 3/2001 | Coon et al. | |
| 6,903,343 B2 | 6/2005 | Amon et al. | |
| 6,924,772 B2 | 8/2005 | Kiernan, Jr. et al. | |
| 2001/0029816 A1* | 10/2001 | Ben-Menachem et al. .... 82/1.3 |
| 2003/0169491 A1* | 9/2003 | Bender et al. ................ 359/356 |

OTHER PUBLICATIONS

Conway et al. Arsenic suiphide athermal singlets for 3-5 μm imaging, SPIE vol. 3061 (Aug. 1997), pp. 396-405.*
Max J. Riedl, "Optical Design Fundamentals for Infrared Systems", SPIE Optical Engineering Press, 1995, pp. 93-102.

* cited by examiner

*Primary Examiner*—David P Porta
*Assistant Examiner*—Shun Lee
(74) *Attorney, Agent, or Firm*—Buchanan Ingersoll & Rooney PC

(57) ABSTRACT

A compact, wide field of view, infrared imaging system with two Mid-Wave Infrared (MWIR) and, optionally, an additional one Long-Wave Infrared (LWIR) band, has a single, color corrected lens element embedded within the detector/dewar assembly. The lens element has two aspherical surface profiles and utilizes a holographic optical element to manipulate and detect bands of energy that are harmonic components of each other. The infrared imaging system simplifies and shrinks the MWIR/LWIR imager while maintaining all of the required functionality. An exemplary infrared imaging apparatus performs at an F-stop (F/#) of at least 1.4 with a square field of view of 90×90 degrees.

21 Claims, 2 Drawing Sheets

MULTIBAND, SINGLE ELEMENT WIDE FIELD OF VIEW INFRARED IMAGING SYSTEM

This application is a continuation of application Ser. No. 09/988,660, filed on Nov. 20, 2001, now abandoned the entire disclosure of the prior application is considered as being part of the disclosure of the present application and is hereby incorporated by reference therein.

BACKGROUND

1. Field of the Invention

The present device relates generally to an infrared imaging system. More specifically, the device relates to wide field of view, infrared imaging systems with mid-wave infrared bands and, optionally long-wave infrared bands.

2. Background

Infrared electromagnetic radiation refers to the region of the electromagnetic spectrum between wavelengths of approximately 0.7 and 1000 µm, which is between the upper limit of the visible radiation region and the lower limit of the microwave region. Infrared radiation is sometimes broken into three sub-regions: near-infrared radiation with wavelengths between 0.7-1.5 µm, intermediate-infrared radiation with wavelengths between 1.5-20 µm, and far-infrared radiation with wavelengths between 20-1000 µm. The intermediate-infrared radiation region is often further broken into the mid-wave (MWIR) region with wavelength limits of 3-5 µm and the long-wave (LWIR) region with wavelength limits of 8-12 µm.

Infrared radiation is produced principally by electromagnetic emissions from solid materials as a result of thermal excitation. The detection of the presence, distribution, and direction of infrared radiation requires techniques which are unique to this spectral region. The wavelengths of infrared radiation are such that optical methods may be used to collect, filter, and direct the infrared radiation. Photosensitive devices convert heat, or infrared electromagnetic radiation, into electrical energy and are often used as infrared sensitive elements. Such photosensitive devices respond in proportion to the number of infrared photons within a certain range of wavelengths to provide electrical energy.

Generally, an imaging infrared sensor includes a plurality of infrared sensitive elements in order to provide suitable resolution of the field of view which is to be monitored. In addition to the plurality of infrared sensitive elements, an infrared sensor includes other components for complete processing of the information provided by incident infrared electromagnetic radiation. Optical filters and apertures are used to define and focus the radiation directed at the infrared sensitive elements. Electronics are necessary for controlling the data collection and processing the collected data from the infrared sensitive elements. Cooling apparatus is necessary to maintain the operation of the infrared sensitive elements as well as the electronics. One approach for processing the electrical energy provided by the plurality of infrared sensitive elements is to use multiplexers to provide a single signal having a serial data stream since it is simpler to process the single resulting serial signal than the plurality of signals which correspond to the plurality of infrared sensitive elements. The serial signal is generally further processed by any number of techniques known in the art to provide interpretable, useful information regarding objects in the field of view of the infrared sensor.

As is known in the art, military and space applications employ infrared electromagnetic radiation detection for such functions as tracking and searching. These applications require the detection of low-level radiation in the intermediate infrared radiation range. One example of an application for infrared detection is in radar systems, where greater angular resolution and obstacle penetration capabilities improve overall platform imaging capabilities while the inclusion of infrared detection, particularly the detection of more than one band, or range, of infrared radiation, makes the system more difficult to jam, or disable.

Electro-optical sensor assemblies, such as infrared imaging systems, use optical components to route and focus received radiation onto a detector. However, the size and weight of electro-optical sensor assemblies have always been a significant design consideration. For example, in an airborne application, the size of the sensor assembly dictates the size of the required gimbal, which in turn affects the overall system size and weight. Since the sensor assembly and gimbal may both be in the airstream, the size of each can affect the overall aircraft drag. In another example, such as in ground applications, a head mirror may be used for elevation pointing. The number of optical apertures and the size of these apertures dictate the head mirror size, which, in turn, affects the size and weight of the surrounding armor plate.

SUMMARY

The present invention is generally directed to an infrared imaging system. The infrared imaging apparatus with a dewar has an internal volume defining a cold space. An IR transmissive window seals the cold space and receives IR energy directly from an IR source. Within the cold space, an optical stop located in front of a first lens, a first lens with aspherical surface profiles on both the first and the second surface, and an IR detector are positioned and aligned in operational communication to receive IR energy directly from the IR transmissive window and direct the IR energy to the detector coincidently positioned at the focal plane of at least a first and second wavelength of IR energy.

The second aspherical surface profile has a holographic optical element that color corrects at least one color band of infrared energy. The holographic optical element may detect a second or subsequent wavelength of IR energy that is a harmonic component of the first wavelength. Preferably, the holographic optical element color corrects a red MWIR band and a blue MWIR band. The holographic optical element also coincidently focuses a MWIR band and a LWIR band of IR energy at a common focal plane. The detector detects and manipulates at least three wavelengths of IR energy including at least one LWIR band of energy, preferably an indigo LWIR band.

An exemplary infrared imaging apparatus has lens made from germanium or silicon and performs at an F-stop (F/#) of at least 1.4 with a square field of view of 90×90 degrees.

BRIEF DESCRIPTION OF THE DRAWING FIGURES

Objects and advantages of the invention will become apparent from the following detailed description of preferred embodiments in connection with the accompanying drawings, in which like numerals designate like elements and in which.

DETAILED DESCRIPTION OF THE PREFERRED EMBODIMENTS

Figure 1:
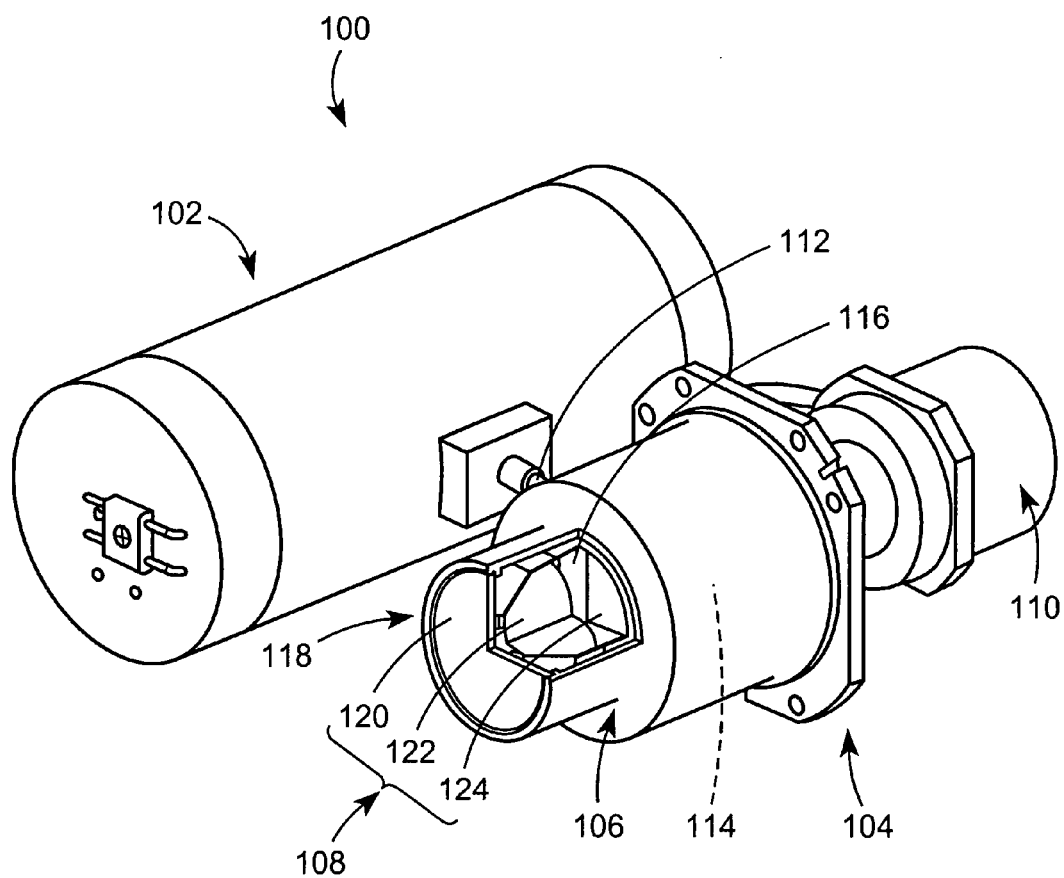
FIG. 1 is a perspective view of the imaging system.

FIG. 1 is a perspective view of an infrared imaging system 100. The infrared imaging system 100 has a compressor housing 102 and an optical housing 104. The optical housing 104 further has a cryogenic subassembly 106, an optical subassembly 108, and an electronics subassembly 110.

The compressor housing 102 contains suitable support components required to maintain cooling of the optical housing 104. Specifically, the compressor housing 102 can contain a compressor for circulating a cooling medium through the compression and expansion cycle used for cooling.

The cryogenic subassembly 106 has a cavity 114, alternatively called a dewar, which defines a cold space 116. Infrared energy detectors generally require cooling to improve performance in converting incident energy into an electrical signal. The cryogenic subassembly 106 provides the required cryogenic cooling capability. The cavity 114 is in fluid communication with the compressor housing 102 through the transfer line 112. The cooling medium, such as liquid nitrogen (LN2), is circulated in a closed loop from the compressor, through the transfer line 112, and through the cavity 114. The cold space 116 is sealed by an IR transmissive window 120 and is evacuated to <50 mTorr, preferably less than 5 mTorr.

The optical subassembly 108 is positioned within the cold space 116 at the receiving end 118 of the optical housing 104. Elements of the optical subassembly 108, including a lens 122 and an IR detector 124, are housed in the cold space 116. Elements of the optical subassembly 108 are maintained at a suitable cryogenic temperature by the cryogenic subassembly 106, typically 150 to 180° K.

The electronics subassembly 110 receives inputs from the IR detector 124 and transmits signals to a processing unit (not shown).

Figure 2:
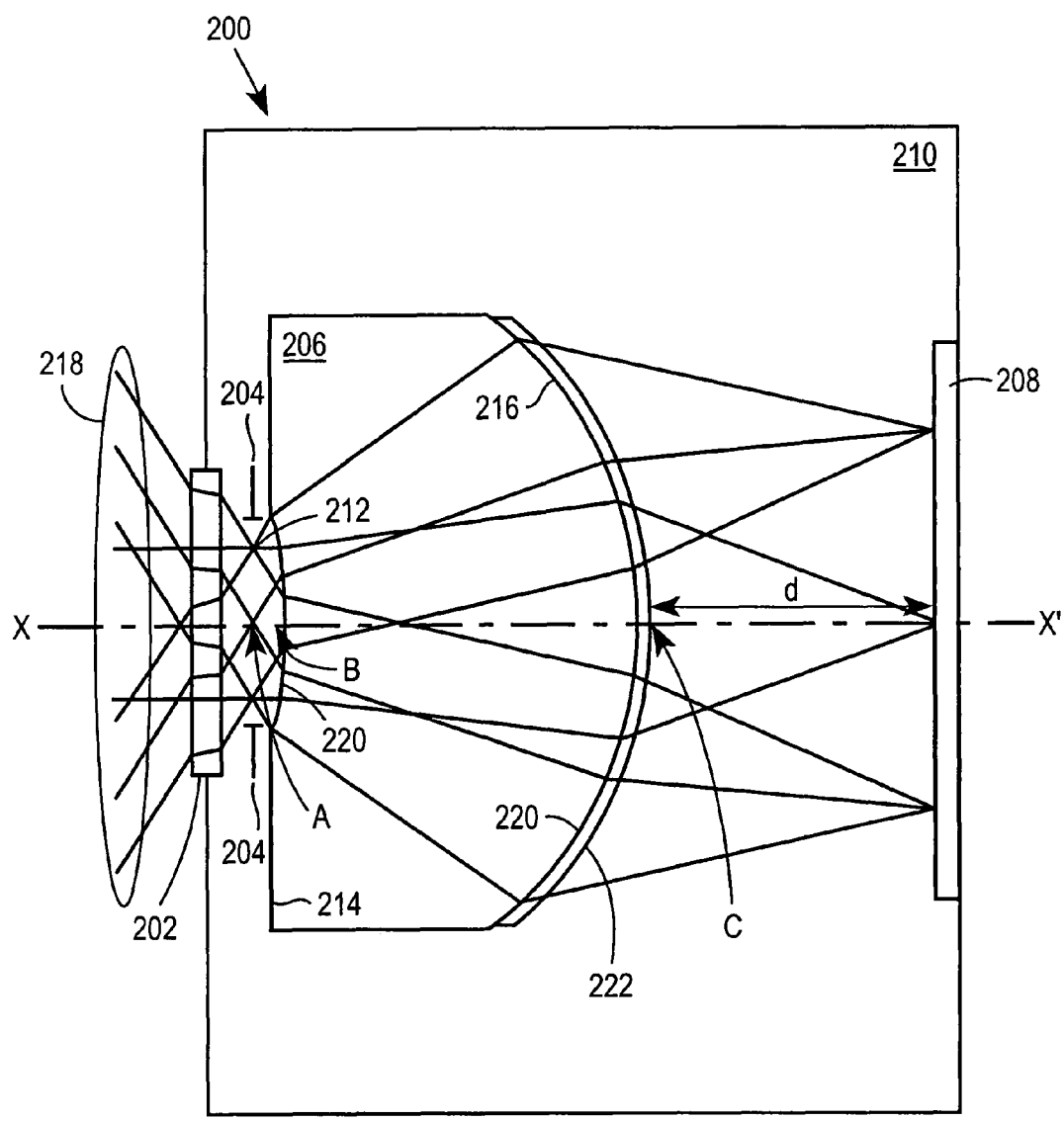
FIG. 2 is a schematic representation of the line trace of energy in a first embodiment of optical components.

FIG. 2 shows a plan cross-section of a first embodiment of an optical subassembly 200. The optical subassembly 200 has an IR transmissive window 202, an optical stop 204, a lens 206, and an IR detector 208. The optical stop 204, lens 206, and IR detector 208 are positioned inside the cold space 210 of the cryogenic subassembly 106 shown in FIG. 1. An example of an IR transmissive window 202 is optical grade germanium or an amorphous solid, such as zinc selenide. The IR transmissive window 202 has a 120° circular field of view and receives incident IR energy directly from an IR source. In an alternative embodiment, there may be an additional filter placed before the IR transmissive window 202 that discriminates a desired wavelength of energy or wavelengths of energy.

The optical stop 204 is positioned in the cold space 210 at the limiting aperture in the transmission path where the incident energy has a first crossover point A. The position of the optical stop 204 may be abutting the lens 206 or it may abut the IR transmissive window 202 and will be determined by the wavelengths of energy to be detected and the characteristics of the other optical components. In a preferred embodiment, the optical stop 204 may be from $^{20}/_{1000}$th to $^{60}/_{1000}$th of an inch from the lens 206; more preferably the optical stop 204 is $^{40}/_{1000}$th of an inch from the lens 206. The optical stop 204 has an opening 212 circularly symmetric about axis X-X', the radius of which is the size of the cross-section of the caustic at the first crossover point A. The caustic is the envelope curve of the transmitted beam. The optical stop 204 helps to prevent stray energy from traveling down the transmission path toward the lens 206 and thus improves optical performance. By placing the optical stop 204 within the cold space 210 and in front of the lens 206, design requirements are simplified while still maintaining the required cold shield efficiency.

A first surface 214 of the lens 206 is oriented toward the IR transmissive window 202 and a second surface 216 that is oriented toward the detector 208. IR energy 218 is directly received by the lens 206 from the IR transmissive window 202. The first and second surfaces 214, 216 of the lens 206 are aspherical over at least a portion of the lens 206 and such that the aspherical surfaces 220 are aligned radially symmetric in the transmission path about axis X-X'. Alternatively, the entire first or second surface 214, 216 may be aspherical. However, the cross-section of the caustic at the points B, C is no greater than the surface area of the first or second surface 214, 216 and is such that the transmission path may propagate through the aspherical surfaces 220.

The second surface 216 of the lens 206 is also a holographic optical element (HOE) 222, alternatively called a binary surface or a diffractive grating on a curved surface. The HOE 222 uses principles of harmonics to discriminate and propagate a plurality of wavelengths. Preferably, the HOE 222 discriminates and propagates at least two wavelengths. For example, a first wavelength is manipulated by the HOE 222, a second wavelength must be a harmonic component of the first wavelength for the HOE 222 to manipulate it. The requirement applies to all subsequent wavelengths to be manipulated by the HOE 222.

A detector 208 is positioned in alignment with the other components of the optical subassembly 200 about the axis X-X' at a focal length distance d from the second surface 216 of the lens 206, at a coincident focal plane to at least 2 wavelengths manipulated and transmitted by the lens 206 and the HOE 222. The detector 208 can discriminate at least two, and preferably multiple, wavelengths of incident energy in the IR spectrum, and more preferably wavelengths at 3-12 μm. The detector 208 processes the wavelengths to produce multiple waveband detection capability within a single detector. In one embodiment, the detector 208 concurrently collects radiation from multiple, adjacent spectral radiation bands. This type of detector may be used in "hyperspectral imaging." An example of such a detector is disclosed in co-assigned U.S. Pat. No. 6,180,990 B1, issued to Claiborne et al., the disclosure of which is incorporated herein by reference.

In an another embodiment, the detector 208 may manipulate multiple wavelengths of incident energy resulting in at least two MWIR and one LWIR band being detected by the infrared imaging system 100. A detector capable of hyperspectral imaging is suitable for this application.

The first and second aspherical surfaces 214, 216 and the HOE 222 combine to manipulate infrared energy from at least two wavebands in the infrared spectrum. In one embodiment, a first waveband is a mid-wave infrared (MWIR) waveband with wavelength of 3-5 μm, preferably 4-4.5 μm, and a second waveband is a mid-wave infrared (MWIR) waveband with wavelength of 3-5 μm, preferably 4-4.5 μm. In a second embodiment, the first and second aspherical surfaces 214, 216, the HOE 222, and the detector 208 combine to manipulate infrared energy from at least two wavebands in the infrared spectrum. In this embodiment, a first and second waveband similar to the first embodiment is detected. A detector 208, as described above, can be a detector suitable for hyperspectral imaging and can manipulate and discriminate a third coincident and coregistered waveband. This third waveband may be a LWIR waveband with wavelength of 8-12 μm, preferably 8.5-9.5 μm.

An aspherical surface may be mathematically defined by:

$$H(x) = \frac{rx^2}{1 + \sqrt{1 - r^2(k+1)x^2}} + ax^4 + bx^6 + cx^8 + dx^{10} \quad \text{Eq. 1}$$

where r=radius of curvature, k=conic coefficient, and a, b, c, and d are aspheric coefficients.

There is a correspondence between the conic coefficient of Eq. 1 and the geometric surface profile. Table 1 illustrates this correspondence.

TABLE 1

Correspondence between k and the type of profile

| Value of k | Type of Profile |
|---|---|
| >0 | ellipse |
| =0 | sphere |
| −1 < k < 0 | ellipse |
| =−1 | parabola |
| <−1 | hyperbola |

In practice, one skilled in the art could utilize commercially available lens design software to obtain suitable values for the coefficients of Eq. 1, including the aspherical coefficients. An example of one such lens design software package is "CODE V©" available from Optical Research Associates of Pasadena, Calif. One skilled in the art could input information including, for example, image size, focal distance, energy distribution across the detector and determine the optimized values for the coefficients of Equation 1. Examples of suitable coefficients for use in an infrared imaging detector in keeping with this invention are shown in Table 2 and 3.

Table 2 is a first embodiment of an optical prescription for the lens 206 of the single element wide field of view infrared imaging system 100. This example is a prescription for a dual band lens.

TABLE 2

Prescription of Dual Band Lens

| # | Description | Radius | k | Thickness | a | b | c | d |
|---|---|---|---|---|---|---|---|---|
| 1 | First Surface | −0.94467 | 28.345216 | 0.548467 | −2.13952 | −69.5274 | 2342.04 | −56841.9 |
| 2 | Second Surface | −0.61281 | 0.1399 | 0.462731 | 0.033459 | −2.3598 | 10.889 | −36.331 |
|   | HOE Coefficients (Radial) |  | −0.0051393 | −0.10212 | 0.91035 | −2.3946 |  |  |
| 3 | Focal Plane |  |  |  |  |  |  |  |

Table 3 is a second embodiment of an optical prescription for the lens 206 of the single element wide field of view infrared imaging system 100. This example is a prescription for a three band lens.

TABLE 3

Prescription of Three Band Lens

| # | Description | Radius | k | Thickness | a | b | c | d |
|---|---|---|---|---|---|---|---|---|
| 1 | First Surface | −1.23508 | 36.049455 | 0.761661 | −1.69104 | −98.6413 | 5589.83 | −162359 |
| 2 | Second Surface | −0.81270 | −0.10748 | 0.480234 | 0.054475 | −0.72423 | 2.9155 | −7.8939 |
|   | HOE Coefficients (Radial) |  | −0.017112 | −0.038991 | 0.55069 | −1.6405 |  |  |
| 3 | Focal Plane |  |  |  |  |  |  |  |

In Tables 2 and 3, "Radius" is the radius of curvature (r), k is the conic coefficient, and a, b, c, and d are the aspherical coefficients. The "thickness of the first surface" is the thickness of the lens 206. The "thickness of the second surface" is the back focal distance, which is the distance from the second surface 216 of the lens 206 to the detector 208, or focal distance d.

The optical performance of an infrared imaging system 100 in keeping with the embodiments described may have an optical F/#=1.4 with a square field of review of 90×90 degrees. Additionally, the infrared imaging system 100 has a wide field of view (field of view greater than 60°).

In operation, incident infrared energy 218 travels through the limiting aperture of the optical stop 204 and is incident to the aspherical portion 220 of the first surface 214 of the lens 206. The infrared energy 218 then is translated by the aspherical surface of the second surface 216 of the lens 206 and the HOE 222 and is focused onto the detector 208.

In an embodiment of an optical layout in keeping with the invention, the incident infrared energy is color corrected to realize at least one band of energy on the detector surface. For example, in the first embodiment the incident infrared energy is color corrected across both the red and blue MWIR bands. In the alternative optical layout, the incident infrared energy is color corrected across the red MWIR, blue MWIR, and indigo LWIR bands.

The single lens 206 is made of silicon and has aspheric surface profiles on both sides. Alternatively, the single lens 206 may be made of germanium. The HOE 222 helps to achieve the required color correction across both the red and blue MWIR bands. The color correction across the indigo LWIR bands is provided by the detector 208 in conjunction with the HOE 222. The optic performs at an F/# of 1.4 with a square field of view of 90 by 90 degrees.

The use of a single, color corrected element in the dewar provides an optical subassembly 200 that is shorter and provides for a better form factor and lower part count for the entire infrared imaging system 100. Also, by enclosing the single lens 206 within the detector dewar, the optical subassembly 200, including the optical stop 204, lens 206 and detector 208, are all located within a single enclosure. Previously, tight alignment tolerances had to be maintained across the detector-to-dewar mount, the dewar-to-optical housing mount and the optical housing-to-optics mount. By eliminating the multiple interfaces the total tolerance budget can be applied on the single interface, reducing the required manufacturing and assembly tolerances and reducing the requirement for precision alignment across multiple interfaces.

Another advantage of being able to place the single, color corrected lens 206 in the cryogenic subassembly 106 is that it places the optical subassembly 200 in a controlled temperature environment. By maintaining the lens 206 at a nearly constant temperature, the need for a passive or active athermalization system to correct the thermally induced focus variations may be eliminated. While this could be accomplished previously by heating or cooling the optics with a separate device, this approach makes use of the cooling capabilities that are already present in the system.

The alignment of the optical components is important so that a detector is located at the focal plane for the lens system. In previous multi-lens imaging systems, it was difficult to ensure alignment of the optical components because the thermal coefficient of expansion resulted in disparate movement of the individual optical components. A unitary structure housed within the cold space essentially eliminates thermal transients amongst the components once a temperature equilibrium has been achieved by the cryogenic housing and compressor, thereby overcoming the alignment problems.

Also, enclosing the optical subassembly 200 in the cryogenic subassembly 106 places the optics in a sealed, evacuated environment, protecting it against dust or other contamination. While this could be accomplished in a separate enclosure, this approach makes use of capabilities already present in the optical housing 104.

Lastly, all of these qualities permit the design of a lower cost system with the same performance capabilities of current, more expensive ones.

In one exemplary application, the use of wide field of view (greater than 100°) MWIR imaging systems on military platforms provides the capability of performing missile warning, defensive infrared search and track, navigation and situational awareness functions. Adding a second wave band to the sensor helps to discriminate between natural and manmade objects and increases the effectiveness of the sensor in these tasks. Additionally, adding a third LWIR band to the sensor further improves the imaging system's ability to discriminate between natural and manmade objects and increases the effectiveness of the sensor in these tasks. Since providing complete spherical coverage around an object requires a maximum of six sensors, the cost, size and complexity of current systems can prohibit their large scale employment.

This invention has direct application to other wide field of view multiband uses, including but not limited to dual band navigation, advanced missile seekers and chemical agent detection.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. An infrared imaging apparatus, comprising:
    a dewar, having an internal volume that defines a cold space;
    an IR transmissive window that seals the cold space to receive IR energy directly from an IR source;
    a lens located within the cold space to receive IR energy directly from the IR transmissive window, the lens has a first aspheric profile on a first side and a second aspheric profile on a second side, the first side parallel to the second side;
    an IR detector located within the cold space in operational communication with the lens and positioned coincident to a common focal plane of at least a first and second wavelength of IR energy;
    an optical stop located within the cold space in front of the lens; and
    a curved holographic optical element disposed on the second aspheric profile;
    wherein the lens and the holographic optical element are constructed and arranged to simultaneously color correct energy having said first wavelength from a first waveband of the infrared spectrum and said second wavelength from a second waveband of the infrared spectrum, wherein the first waveband is different from the second waveband, the second wavelength being a harmonic component of the first wavelength, and to focus the color corrected energy onto the common focal plane.

2. The infrared imaging apparatus of claim 1, wherein the second side faces the detector.

3. The infrared imaging apparatus of claim 1, wherein the detector is a hyperspectral detector.

4. The infrared imaging apparatus of claim 1, wherein the detector detects at least three wavelengths of IR energy including at least one LWIR band of energy.

5. The infrared imaging apparatus of claim 1, wherein the wavebands are chosen from: MWIR and LWIR, and wherein the first waveband is MWIR band and the second waveband is LWIR.

6. The infrared imaging apparatus of claim 1, wherein the lens is made of germanium.

7. The infrared imaging apparatus of claim 1, wherein the lens is made of silicon.

8. The infrared imaging apparatus of claim 1, wherein the apparatus performs at an F-stop (F/#) of at least 1.4 with a square field of view of 90×90 degrees.

9. The infrared imaging apparatus of claim 1, wherein the detector concurrently collects radiation from multiple, adjacent spectral radiation bands.

10. The infrared imaging apparatus of claim 1, wherein the first aspheric surface has the following prescription:
radius=−0.94467;
k=28.345216;
a=−2.13952;
b=−69.5274;
c=2342.04;
d=−56841.9;
and first surface thickness=0.548467.

11. The infrared imaging apparatus of claim 10, wherein the second aspheric surface has the following prescription:
radius =−0.61281;
k =0.1399;
a =0.033459;
b =−2.3598;
c =10.889;
d =−36.331;
and second surface thickness =0.462731.

12. The infrared imaging apparatus of claim 11, wherein the holographic optical element has the following prescription:
−0.0051393, −0.10212, 0.91035, −2.3946.

13. The infrared imaging apparatus of claim 1, wherein the first aspheric surface has the following prescription:
radius =−1.23508;
k =36.049455;
a =−1.69104;
b =−98.6413;
c =5589.83;
d =−162359; and
first surface thickness =0.761661.

14. The infrared imaging apparatus of claim 13, wherein the second aspheric surface has the following prescription:
radius =−0.81270;
k =−0.10748;
a =0.054475;
b =−0.72423;
c =2.9155;
d =−7.8939; and
second surface thickness =0.480234.

15. The infrared imaging apparatus of claim 14, wherein the holographic optical element has the following prescription:
−0.017112, −0.038991, 0.55069, −1.6405.

16. The infrared imaging apparatus of claim 1, wherein the lens comprises the only lens present in the apparatus.

17. An infrared imaging apparatus, comprising:
a dewar, having an internal volume that defines a cold space;
an IR transmissive window that seals the cold space to receive IR energy directly from an IR source;
a single lens located within the cold space to receive IR energy directly from the IR transmissive window, the lens has a first aspheric profile on a first side and a second aspheric profile on a second side, the first side parallel to the second side;
an IR detector located within the cold space in operational communication with the lens and positioned coincident to a common focal plane of at least a first and second wavelength of IR energy;
an optical stop located within the cold space in front of the lens; and
a curved holographic optical element disposed on the second aspheric profile;
wherein the lens and the holographic optical element are constructed and arranged to simultaneously color correct energy having said first wavelength from a first waveband of the infrared spectrum and said second wavelength from a second waveband of the infrared spectrum, and to focus the color corrected energy onto the common focal plane;
wherein the first waveband and the second waveband are:
 (i) different color bands within the same IR spectral band; or
 (ii) different IR spectral bands.

18. The infrared imaging apparatus of claim 17, wherein the IR spectral band comprises MWIR, and the first and second wavebands are different color bands within the MWIR spectral band.

19. The infrared imaging apparatus of claim 18, wherein the different color bands are the red and blue bands.

20. The infrared imaging apparatus of claim 17, wherein the different IR spectral bands comprise MWIR and LWIR, and the first and second different wavebands are the MWIR spectral band and the LWIR spectral band.

21. The infrared imaging apparatus of claim 17, wherein the single lens comprises the only lens present in the apparatus.

* * * * *